United States Patent
Furutachi et al.

(10) Patent No.: US 7,920,607 B2
(45) Date of Patent: Apr. 5, 2011

(54) WAVELENGTH CONVERSION APPARATUS, LASER LIGHT GENERATING APPARATUS AND WAVELENGTH CONVERSION METHOD

(75) Inventors: Ryo Furutachi, Tokyo (JP); Tetsuro Kuwayama, Chiba (JP); Hisashi Masuda, Chiba (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 12/498,480

(22) Filed: Jul. 7, 2009

(65) Prior Publication Data

US 2010/0008387 A1   Jan. 14, 2010

(30) Foreign Application Priority Data

Jul. 11, 2008   (JP) .................. 2008-181049

(51) Int. Cl.
*H01S 3/10* (2006.01)
(52) U.S. Cl. ................ 372/22; 372/15; 372/16; 372/21; 372/25
(58) Field of Classification Search .............. 372/15–16, 372/21–22
See application file for complete search history.

(56) References Cited

U.S. PATENT DOCUMENTS

| | | | | |
|---|---|---|---|---|
| 2005/0226285 A1* | 10/2005 | Sakata et al. | .................... | 372/22 |
| 2008/0212085 A1* | 9/2008 | Wada et al. | ................. | 356/239.2 |
| 2008/0291951 A1* | 11/2008 | Konttinen et al. | ............... | 372/21 |

FOREIGN PATENT DOCUMENTS

| | | |
|---|---|---|
| JP | 05-011287 | 1/1993 |
| JP | 10-268367 | 10/1998 |
| JP | 11-064903 | 3/1999 |
| JP | 2000-098434 | 4/2000 |
| JP | 2000-292819 | 10/2000 |
| JP | 2003-057696 | 2/2003 |
| JP | 2004-022946 | 1/2004 |
| JP | 2006-030594 | 2/2006 |
| JP | 2006-317724 | 11/2006 |

OTHER PUBLICATIONS

Japanese Patent Office Action corresponding to Japanese Serial No. 2008-181049 dated Apr. 20, 2010.

* cited by examiner

*Primary Examiner* — Dung T Nguyen
(74) *Attorney, Agent, or Firm* — SNR Denton US LLP

(57) ABSTRACT

A wavelength conversion apparatus capable of keeping high wavelength conversion efficiency for a longer time than ever before is provided. A wavelength conversion apparatus includes: a wavelength conversion section including a nonlinear optical crystal, and performing wavelength conversion of incident laser light by allowing the incident laser light to pass through the nonlinear optical crystal; and a relative position control section, when wavelength conversion is performed by the wavelength conversion section, relatively displacing the incident position of the incident laser light in an incident plane into which the incident laser light enters of the nonlinear optical crystal in a direction including a projection direction component of a +C axis to the incident plane in the nonlinear optical crystal or a direction orthogonal to the projection direction component.

17 Claims, 7 Drawing Sheets

WAVELENGTH CONVERSION APPARATUS, LASER LIGHT GENERATING APPARATUS AND WAVELENGTH CONVERSION METHOD

BACKGROUND OF THE INVENTION

1. Field of the Invention

The present invention relates to a wavelength conversion apparatus and a wavelength conversion method which convert the wavelength of incident laser light, and a laser light generating apparatus including such a wavelength conversion apparatus.

2. Description of the Related Art

Among nonlinear optical crystals used for converting the wavelength of laser light, a BBO (beta barium borate; $\beta\text{-BaB}_2\text{O}_4$) crystal and a CLBO ($\text{CsLiB}_6\text{O}_{10}$) crystal are used specifically for converting the wavelength of a high-frequency wave (short wavelength), and they often receive laser light in a deep ultraviolet region. Therefore, when the nonlinear optical crystals are used for a long time, the nonlinear optical crystals are damaged to cause a decline in wavelength conversion efficiency.

Therefore, to allow the nonlinear optical crystals to keep high wavelength conversion efficiency for a long time, various techniques have been proposed in related art. For example, Japanese Unexamined Patent Application Publication No. H10-268367 has proposed a method of moving a nonlinear optical crystal. Moreover, for example, Japanese Unexamined Patent Application Publication No. 2006-30594 has proposed a method of increasing the longevity of a nonlinear optical crystal by adjusting the angle of the nonlinear optical crystal in addition to moving the nonlinear optical crystal. Further, Japanese Unexamined Patent Application Publication No. 2006-317724 has proposed a method of reducing output fluctuation by increasing the number of times a nonlinear optical crystal is moved to reduce the movement amount of the nonlinear optical crystal.

SUMMARY OF THE INVENTION

However, among nonlinear optical crystals, for example, in some nonlinear optical crystals such as a BBO crystal, the shape of a damage distribution caused by receiving laser light in a deep ultraviolet region is asymmetric with respect to a position where the laser light in the deep ultraviolet region is received. In such a case, a necessary movement amount for recovery of wavelength conversion efficiency depends on a direction where the nonlinear optical crystal is moved. Therefore, to keep high wavelength conversion efficiency for a long time, it is desirable to fix the movement direction of the nonlinear optical crystal to an appropriate direction.

It is desirable to provide a wavelength conversion apparatus and a wavelength conversion method capable of keeping high wavelength conversion efficiency for a longer time than ever before, and a laser light generating apparatus including such a wavelength conversion apparatus.

According to an embodiment of the invention, there is provided a wavelength conversion apparatus including: a wavelength conversion section including a nonlinear optical crystal, and performing wavelength conversion of incident laser light by allowing the incident laser light to pass through the nonlinear optical crystal; and a relative position control section, when wavelength conversion is performed by the wavelength conversion section, relatively displacing the incident position of the incident laser light in an incident plane into which the incident laser light enters of the nonlinear optical crystal in a direction including a projection direction component of a +C axis to the incident plane in the nonlinear optical crystal or a direction orthogonal to the projection direction component. In this case, "+C axis (direction)" means orientation of a C axis in a nonlinear optical crystal (for example, a pyroelectric crystal, a piezoelectric crystal or a ferroelectric crystal) and a plus (+) direction of spontaneous polarization. Moreover, in a like manner, "−C axis (direction)" means orientation of the C axis and a minus (−) direction of spontaneous polarization.

According to an embodiment of the invention, there is provided a laser light generating apparatus including: a light source emitting laser light as a fundamental wave; a wavelength conversion section including a nonlinear optical crystal, and performing wavelength conversion of incident laser light by allowing the incident laser light to pass through the nonlinear optical crystal; and the above-described relative position control section.

According to an embodiment of the invention, there is provided a wavelength conversion method including the steps of: performing wavelength conversion of incident laser light by allowing the incident laser light to pass through a nonlinear optical crystal; and when performing wavelength conversion, relatively displacing the incident position of the incident laser light in an incident plane into which the incident laser light enters of the nonlinear optical crystal in a direction including a projection direction component of a +C axis to the incident plane in the nonlinear optical crystal or a direction orthogonal to the projection direction component.

In the wavelength conversion apparatus, the laser light generating apparatus and the wavelength conversion method according to the embodiment of the invention, the incident laser light passes through the nonlinear optical crystal, thereby wavelength conversion of the incident laser light is performed. At this time, the incident position of the incident laser light is relatively displaced in the above-described incident plane in a direction including a projection direction component of the +C axis to the incident plane in the nonlinear optical crystal or a direction orthogonal to the projection direction component (that is, a direction not including the projection direction component of the −C axis to the incident plane in the nonlinear optical crystal). In other words, the incident position of the incident laser light is displaced to a position selectively departed from an laser light absorption coefficient increase region (in a direction including the projection direction component of the −C axis to the incident plane) in the nonlinear optical crystal, thereby the wavelength conversion efficiency is efficiently recovered in the case where the nonlinear optical crystal is deteriorated due to absorption of the laser light.

In the wavelength conversion apparatus, the laser light generating apparatus or the wavelength conversion method according to the embodiment of the invention, in the case where wavelength conversion of the incident laser light entering into the nonlinear optical crystal is performed, the incident position of the incident laser light is relatively displaced in the above-described incident plane in a direction including the projection direction component of the +C axis to the incident plane in the nonlinear optical crystal or a direction orthogonal to the projection direction component. Therefore, in the case where the nonlinear optical crystal is deteriorated due to absorption of the laser light, the wavelength conversion efficiency is efficiently recovered. Therefore, high wavelength conversion efficiency may be kept for a longer time than ever before.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
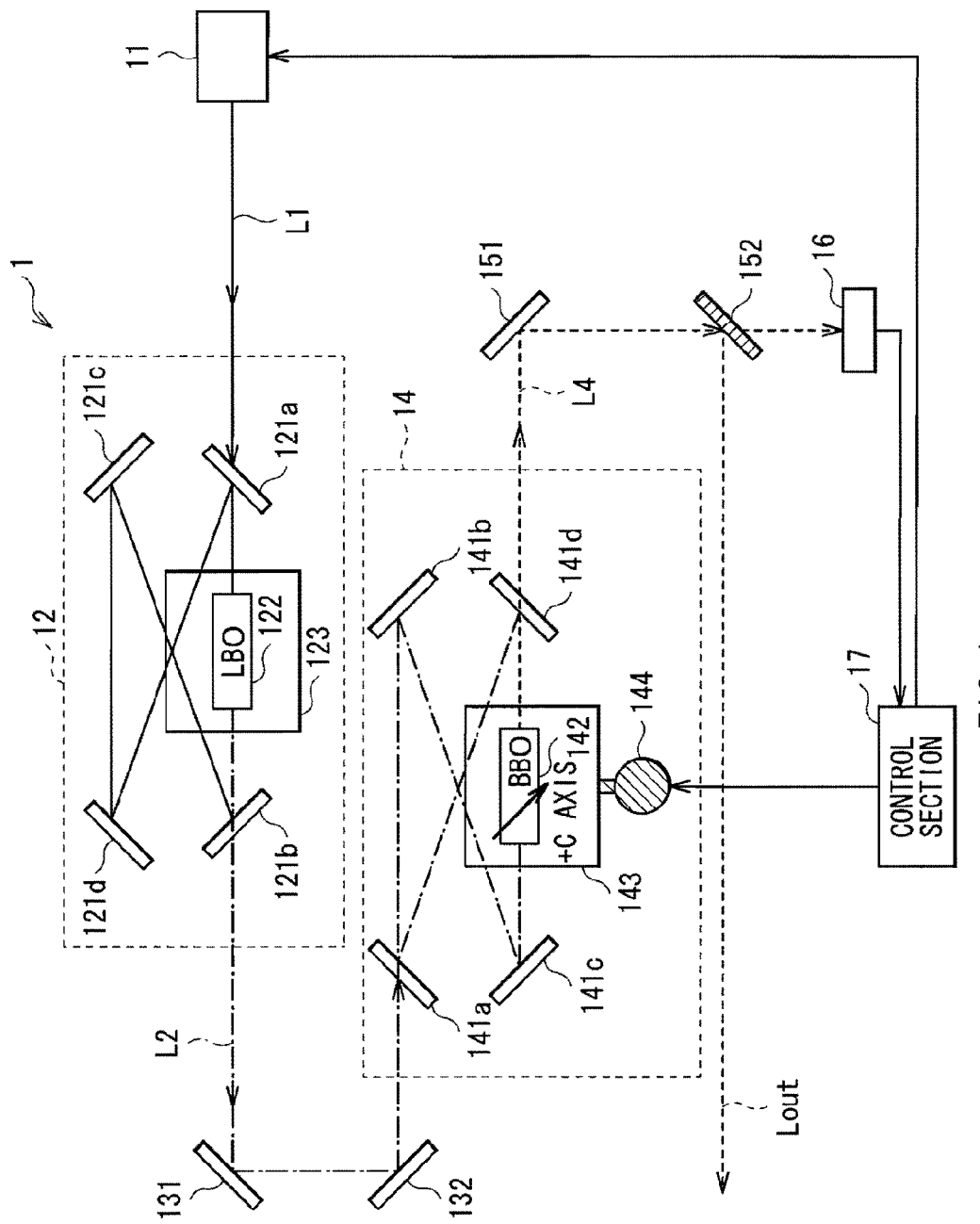
FIG. 1 is an illustration of the whole configuration of a laser light generating apparatus according to an embodiment of the invention.

FIG. 1 illustrates the whole configuration of a laser light generating apparatus (a laser light generating apparatus 1) according to an embodiment of the invention. The laser light generating apparatus 1 outputs output laser light Lout (for example, laser light in a deep ultraviolet region) generated by converting the wavelength of fundamental wave laser light (for example, laser light in a red wavelength region) to outside. The laser light generating apparatus 1 includes a fundamental wave generating section 11, a second harmonic wave generating section 12, mirrors 131 and 132, a fourth harmonic wave generating section 14, a mirror 151, a half mirror 152, a light amount monitor section 16 and a control section 17. A wavelength conversion method according to an embodiment of the invention will be also described below, since the wavelength conversion method is embodied in the laser light generating apparatus 1 according to the embodiment of the invention.

The fundamental wave generating section 11 includes a light source (a laser light source) emitting laser light as a fundamental wave L1. As such a fundamental wave L1, for example, laser light in a wavelength region ranging from an infrared wavelength region to a red wavelength region (a wavelength region of approximately 1200 nm to 750 nm) is used. Moreover, as a light source emitting laser light in the wavelength region ranging from the infrared wavelength region to the red wavelength region, for example, a laser light source such as a Nd:YAG laser, a Nd:YVO4 laser, a Yb:YAG laser or a Yb-fiber laser using a laser material formed by doping a crystal, a glass, a fiber or the like with a rare-earth ion such as neodymium, ytterbium or erbium is used.

The second harmonic wave generating section 12 includes four mirrors 121a to 121d, an LBO (LiB$_3$O$_5$) crystal as a nonlinear optical crystal and an LBO holding stage 123 for holding the LBO crystal 122. In the second harmonic wave generating section 12, the fundamental wave L1 from the fundamental wave generating section 11 passes through the LBO crystal 122 while being reflected by the mirrors 121a to 121d, thereby to be wavelength-converted into a second harmonic wave L2. More specifically, for example, wavelength conversion from laser light (the fundamental wave L1) in a near-infrared wavelength region to laser light (the second harmonic wave L2) in a green wavelength region (a wavelength region of approximately 500 nm to 550 nm) is performed.

The mirrors 131 and 132 reflect the second harmonic wave L2 outputted from the second harmonic wave generating section 12 so as to allow the second harmonic wave L2 to enter into the fourth harmonic wave generating section 14.

The fourth harmonic wave generating section 14 includes four mirrors 141a to 141d, a BBO crystal 142 as a nonlinear optical crystal, a BBO holding stage 143 for holding the BBO crystal 142 and a holding stage driving section 144 driving the BBO holding stage 143.

The BBO crystal 142 has a +C axis in a direction as illustrated in the drawing with respect to an incident plane (an incident plane S1 which will be described later) into which the second harmonic wave L2 as incident laser light enters. Moreover, the holding stage driving section 144 displaces the BBO holding stage 143 in response to control by the control section 17 to relatively displace an incident position into which the second harmonic wave L2 enters in the BBO crystal 142. The holding stage driving section 144 includes, for example, a motor or the like. In addition, displacement in this case is basically parallel movement, but as an application example, the displacement may be a combination of such parallel movement and very small rotational movement by 2 to 3 degrees or less.

In the fourth harmonic wave generating section 14, the second harmonic wave L2 from the second harmonic wave generating section 12 passes through the BBO crystal 142 while being reflected by the mirrors 141a to 141d so as to be wavelength-converted into the fourth harmonic wave L4. More specifically, wavelength conversion from laser light (the second harmonic wave L2) in the green wavelength region to laser light (the fourth harmonic wave L4) in a deep ultraviolet region (a wavelength region of approximately 190 nm to 300 nm) is performed.

The mirror 151 and the half mirror 152 reflect the fourth harmonic wave L4 outputted from the fourth harmonic wave generating section 14 to output the fourth harmonic wave L4 as output laser light Lout to outside. However, a part of the incident fourth harmonic wave L4 is not reflected by the half mirror 152, and passes though the half mirror 152, thereby the fourth harmonic wave L4 passing through the half mirror 152 enters into the light amount monitor section 16.

The light amount monitor section 16 detects the light amount of the fourth harmonic wave L4 by receiving a part of laser light (the fourth harmonic wave L4) generated by wavelength conversion in the fourth harmonic wave generating section 14 in a manner as described above. Information about the light amount of the fourth harmonic wave L4 detected in such a manner is outputted to the control section 17.

The control section 17 controls the displacement operation of the BBO holding stage 143 by the holding stage driving section 144 so as to displace the BBO crystal 142 in a predetermined direction. As a displacement technique at this time, the displacement is continuously performed by a displacement amount of approximately 50 μm at predetermined time intervals (for example, intervals of approximately 500 hours) or along a time axis. The control section 17 also has a function of controlling the output of a light source in the fundamental wave generating section 11 so that the light amount of the fourth harmonic wave L4 detected by the light amount monitor section 16 is kept constant. More specifically, when the detected light amount of the fourth harmonic wave L4 is reduced, the output of the light source in the fundamental wave generating section 11 is controlled to be increased. On the other hand, when the detected light amount of the fourth harmonic wave L4 increases, the output of the light source in the fundamental wave generating section 11 is controlled to be reduced.

In this case, referring to FIGS. 2A, 2B and 3, the movement direction (displacement direction) of the BBO crystal 142 by the control section 17 or the like will be briefly described below. FIG. 3 illustrates changes in absorption coefficient of light with a wavelength of 266 nm in each position along a +C axis direction (refer to FIGS. 2A and 2B) of a BBO crystal before and after the BBO crystal is irradiated with deep ultraviolet pulse laser light (wavelength: 266 nm) with an output of 500 mW for 8 hours. A position "0" in FIG. 3 means a position irradiated with the deep ultraviolet pulse laser light.

As illustrated in FIG. 3, in the BBO crystal, it is obvious that the absorption coefficient of light with a wavelength of 266 nm is pronouncedly increased toward a C-axis minus direction from an irradiation position. In other words, for example, as illustrated in FIGS. 2A and 2B, in an incident plane S1 into which the second harmonic wave L2 enters of the BBO crystal 142, an absorption coefficient increase region 21 for the fourth harmonic wave L4 is present in a direction including a projection direction component of a −C axis to the incident plane S1 with respect to the incident position of the second harmonic wave L2.

Figure 2A:
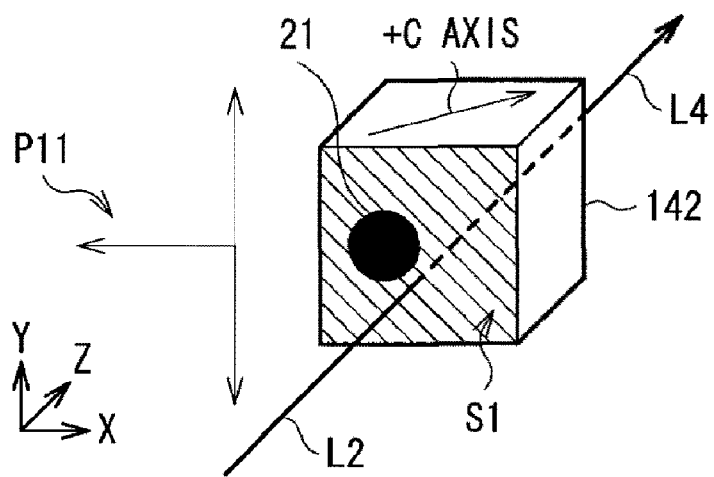
FIGS. 2A and 2B are perspective views for briefly describing the movement direction of a nonlinear optical crystal.
Figure 2B:
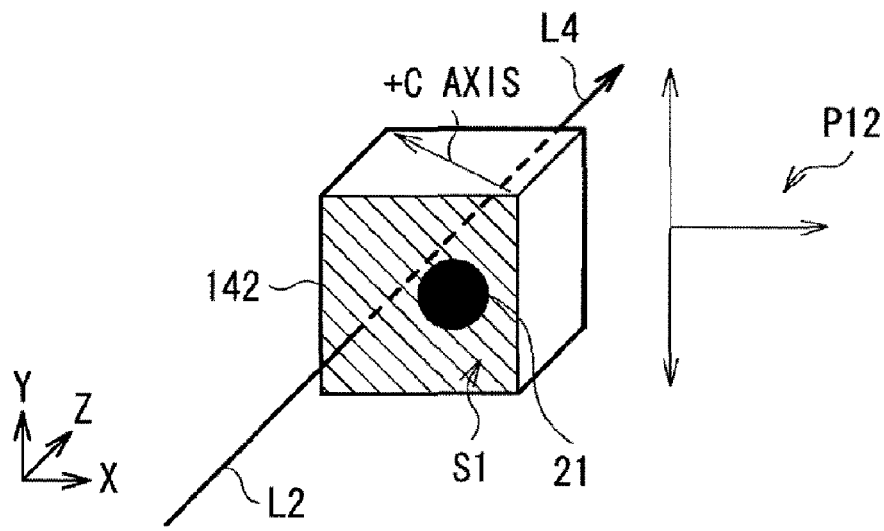
Figure 3:
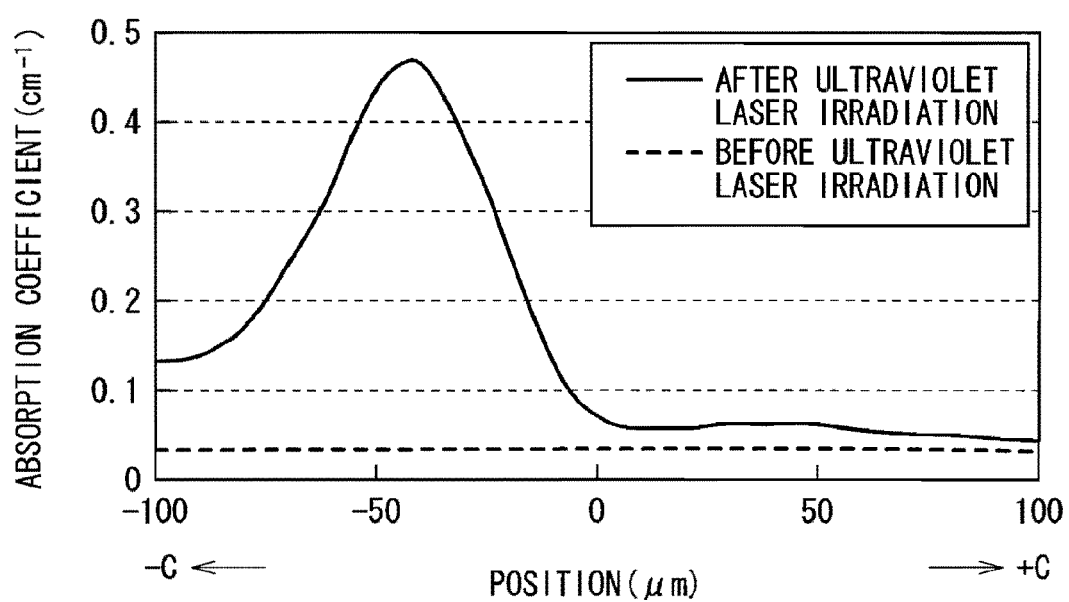
FIG. 3 is a plot for briefly describing a relationship between a position on a nonlinear optical crystal and an absorption coefficient.

Therefore, in the embodiment, while wavelength conversion is performed by the fourth harmonic wave generating section 14, for example, as illustrated in FIG. 2A or 2B, the control section 17, the holding stage driving section 144 and the BBO holding stage 143 displace the BBO crystal 142 in the incident plane S1 in a direction (refer to crystal movement directions P11 and P12 in the drawing) not including a projection direction component of a +C axis to the incident plane S1 so as to relatively displace the incident position of the second harmonic wave L2 in the incident plane S1 in a direction not including the projection direction component of the −C axis to the incident plane S1 (that is, a direction avoiding the absorption coefficient increase region 21). In addition, the movement direction (the displacement direction) of the BBO crystal 142 by the control section 17 or the like will be described in detail later.

Herein, the fourth harmonic wave generating section 14, the control section 17 and the light amount monitor section 16 correspond to specific examples of "a wavelength conversion apparatus" in the invention. Moreover, the mirrors 141a to 141d and the BBO crystal 142 correspond to specific examples of "a wavelength conversion section" in the invention. The BBO holding stage 143, the holding stage driving section 144 and the control section 17 correspond to specific examples of "a relative position control section" in the invention. The BBO crystal 142 corresponds to a specific example of "a nonlinear optical crystal" in the invention. The fundamental wave generating section 11 corresponds to a specific example of "a light source" in the invention, and the light amount monitor section 16 corresponds to a specific example of "a light amount detection section" in the invention, and the control section 17 corresponds to a specific example of "a light source control section" and "a control section" in the invention.

Next, functions and effects of the laser light generating apparatus 1 according to the embodiment will be described below.

In the laser light generating apparatus 1, laser light as the fundamental wave L1 is emitted from the fundamental wave generating section 11 to enter into the second harmonic wave generating section 12. In the second harmonic wave generating section 12, the fundamental wave L1 passes through the LBO crystal 122 while being reflected by the mirrors 121a to 121d so as to be wavelength-converted into the second harmonic wave L2. The second harmonic wave L2 is reflected by the mirrors 131 and 132 to enter into the fourth harmonic wave generating section 14. In the fourth harmonic wave generating section 14, the second harmonic wave L2 passes through the BBO crystal 142 while being reflected by the mirrors 141a to 141d so as to be wavelength-converted into the fourth harmonic wave L4. Then, the fourth harmonic wave L4 is reflected by the mirror 151 and the half mirror 152 to be outputted as the output laser light Lout to outside.

At this time, a part of the incident fourth harmonic wave L4 is not reflected by the half mirror 152 and passes through the half mirror 152, and the fourth harmonic wave L4 having passed through the half mirror 152 enters into the light amount monitor section 16. In the light amount monitor section 16, the light amount of the incident fourth harmonic wave L4 is detected, and information about the detected light amount of the fourth harmonic wave L4 is outputted to the control section 17. Then, the control section 17 controls the output of the light source in the fundamental wave generating section 11 so that the light amount of the fourth harmonic wave L4 detected by the light amount monitor section 16 is kept constant.

In this case, in the embodiment, as described above, while wavelength conversion is performed by the fourth harmonic wave generating section 14, the control section 17, the holding stage driving section 144 and the BBO holding stage 143 control the BBO crystal 142 so as to displace the BBO crystal 142 in a predetermined direction, thereby the incident position of the second harmonic wave L2 with respect to the BBO crystal 142 is relatively displaced.

Figure 4A:
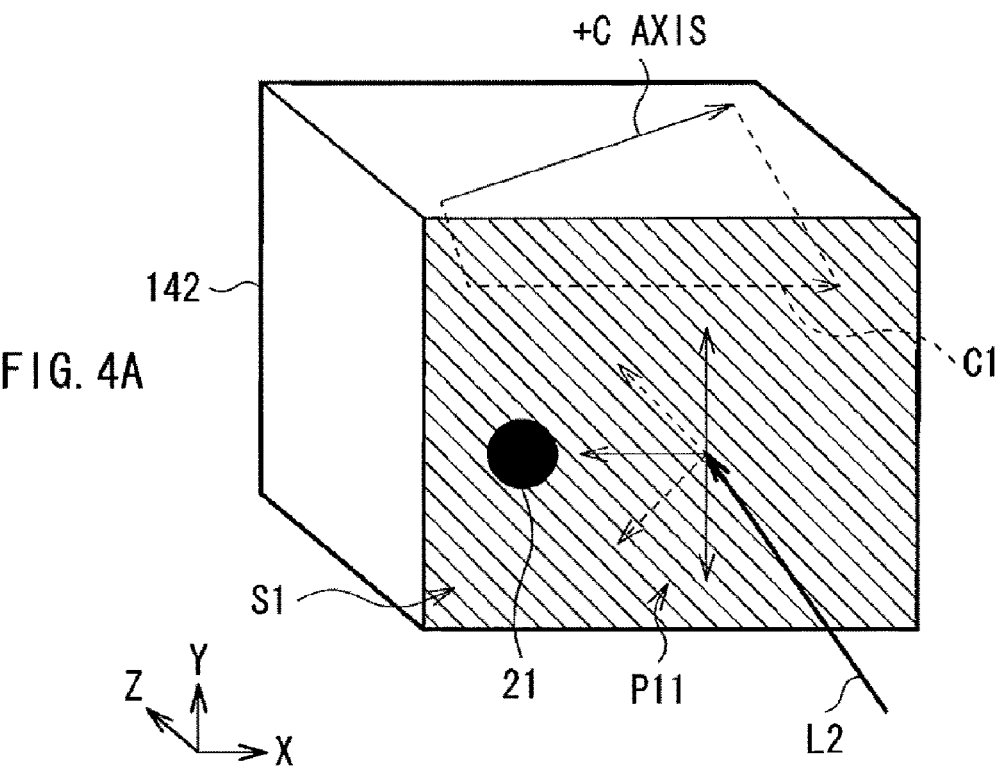
FIGS. 4A and 4B are perspective views for specifically describing the movement direction of the nonlinear optical crystal.
Figure 4B:
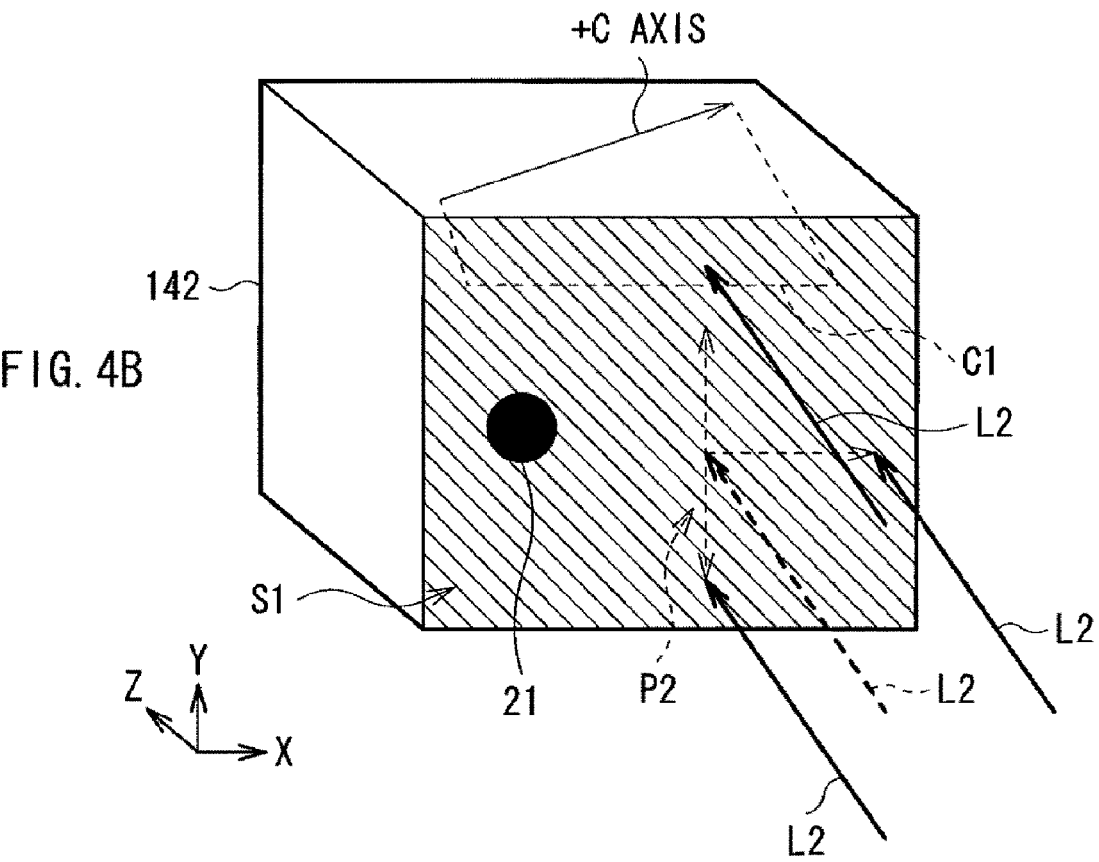

More specifically, for example, as illustrated in FIG. 4A, in the incident plane S1 for the second harmonic wave L2, the BBO crystal 142 is displaced in a direction (refer to the crystal movement direction P11 in the drawing) not including the projection direction component C1 of the +C axis to the incident plane S1 in the BBO crystal 142. Thereby, for example, as illustrated in FIG. 4B, in the incident plane S1, the incident position of the second harmonic wave L2 is relatively displaced in a direction avoiding the absorption coefficient increase region 21 (more specifically, a direction including the above-described projection direction component C1 or a direction orthogonal to the projection direction component C1; refer to a movement direction P2 of a laser light incident position in the drawing).

Figure 5:
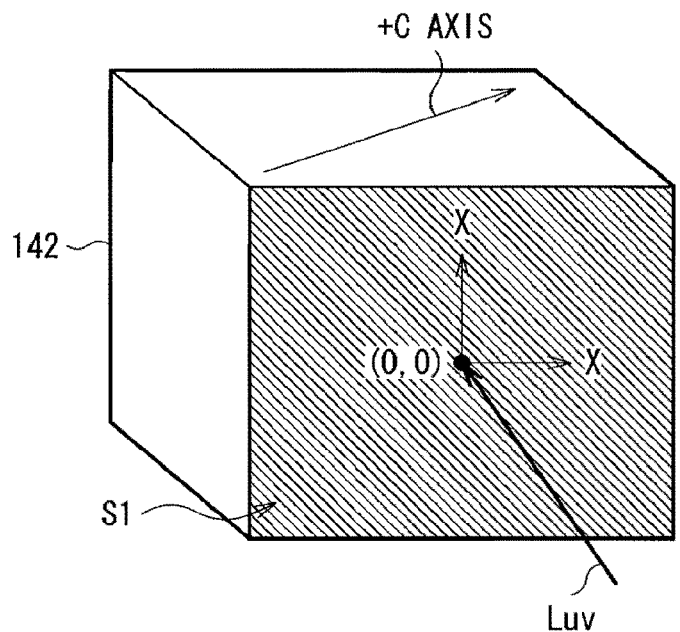
FIG. 5 is a perspective view for describing a positional relationship in the case where the nonlinear optical crystal is irradiated with ultraviolet laser light.
Figure 6:
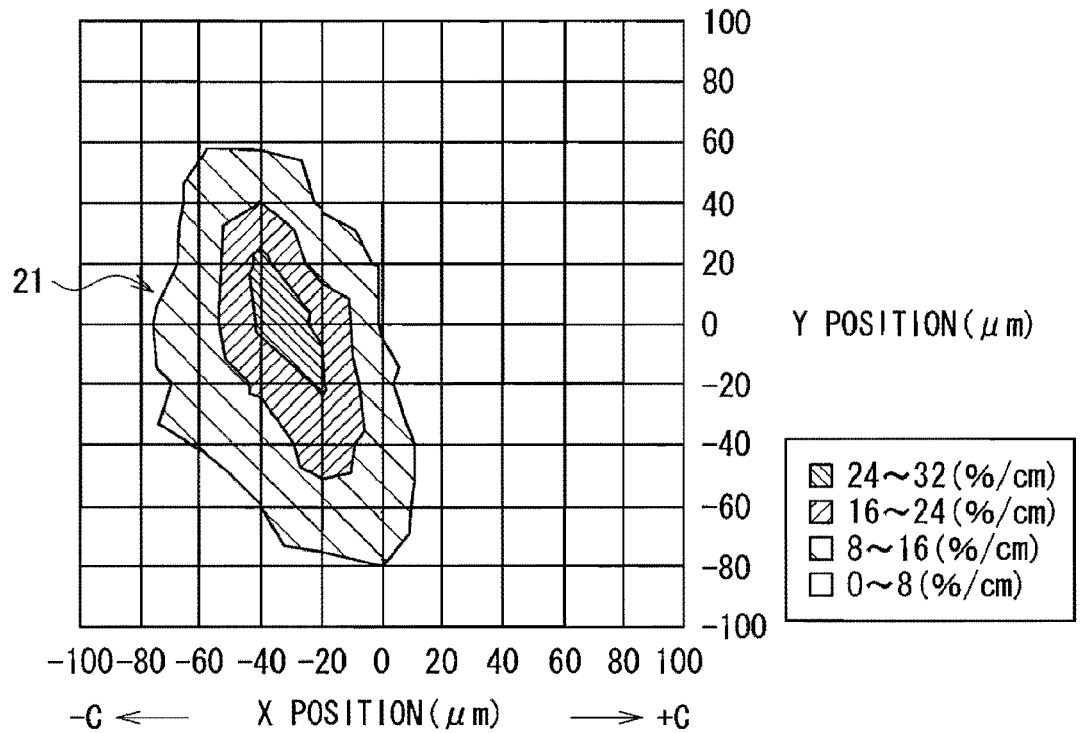
FIG. 6 is a plot for describing a relationship between a laser light incident plane and an amount of increase in absorption coefficient in the case illustrated in FIG. 5.

The BBO crystal is displaced in such a direction because of the following reasons. For example, as illustrated in FIG. 5, in the case where ultraviolet laser light LuV enters into the incident plane S1 of the BBO crystal 142 under the following ultraviolet irradiation conditions, for example, as illustrated in FIG. 6, the absorption coefficient increase region 21 is present toward a C-axis minus direction in the BBO crystal 142. Then, when the ultraviolet laser light Luv continues to enter around such an absorption coefficient increase region 21, the BBO crystal 142 is damaged (deteriorated) due to an increase in the absorption amount of the ultraviolet laser light Luv, thereby to cause a decline in wavelength conversion efficiency in the fourth harmonic wave generating section 14. In FIGS. 5 and 6, an X axis and a Y axis are set in the incident plane S1, and the incident position of the ultraviolet laser light Luv is (X, Y)=(0, 0).

Ultraviolet irradiation conditions
Ultraviolet laser output: 300 mW
Beam diameter: 65 μm (X)×135 μm (Y)
Polarization direction: e-ray (extraordinary ray)

Therefore, in the embodiment, when the BBO crystal 142 is displaced in the above-described manner, the incident position of the second harmonic wave L2 is displaced to a position selectively departed from the absorption coefficient increase region 21 (in a direction including the projection direction component of the −C axis to the incident plane) in the BBO crystal 142 (refer to an arrow P2 in FIG. 4B), thereby the wavelength conversion efficiency in the fourth harmonic wave generating section 14 is efficiently recovered in the case where the BBO crystal 142 is deteriorated, for example, due to the absorption of the fourth harmonic wave L4 in the deep ultraviolet region.

More specifically, for example, the incident position of the second harmonic wave L2 is relatively displaced according to the output value of the light source in the fundamental wave generating section 11 controlled by the control section 17. More specifically, for example, as the output value of the light source in the fundamental wave generating section 11 increases, the relative displacement amount of the incident position of the second harmonic wave L2 or the relative displacement speed of the incident position of the second harmonic wave L2 is increased, or time intervals when relatively displacing the incident position of the second harmonic wave L2 is reduced.

Figure 7A:
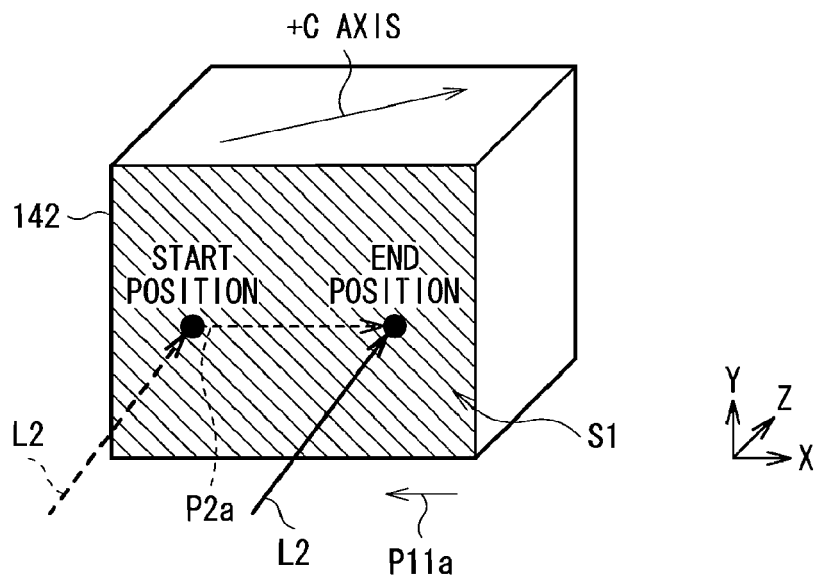
FIGS. 7A and 7B are perspective views for specifically describing the movement direction of the nonlinear optical crystal in the case where a nonlinear optical crystal movement mechanism corresponds to one-dimensional movement.
Figure 7B:
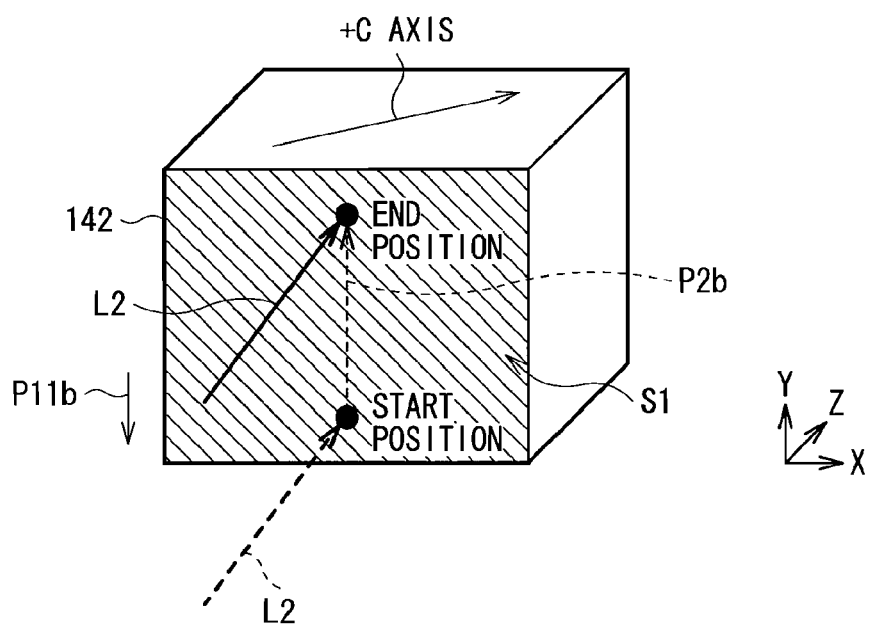
Figure 8A:
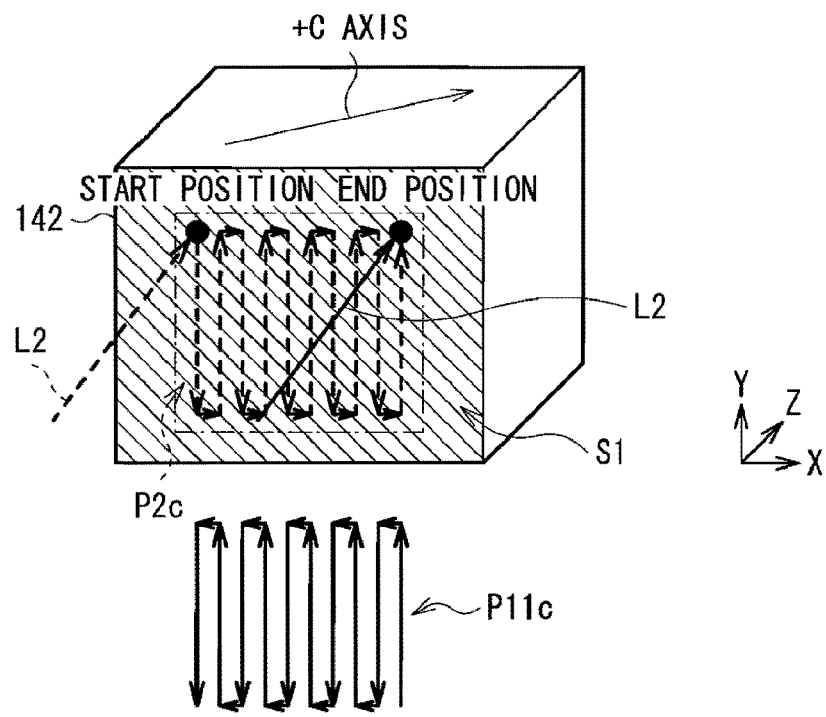
FIGS. 8A and 8B are perspective views for specifically describing the movement direction of the nonlinear optical crystal in the case where the nonlinear optical crystal movement mechanism f corresponds to two-dimensional movement.
Figure 8B:
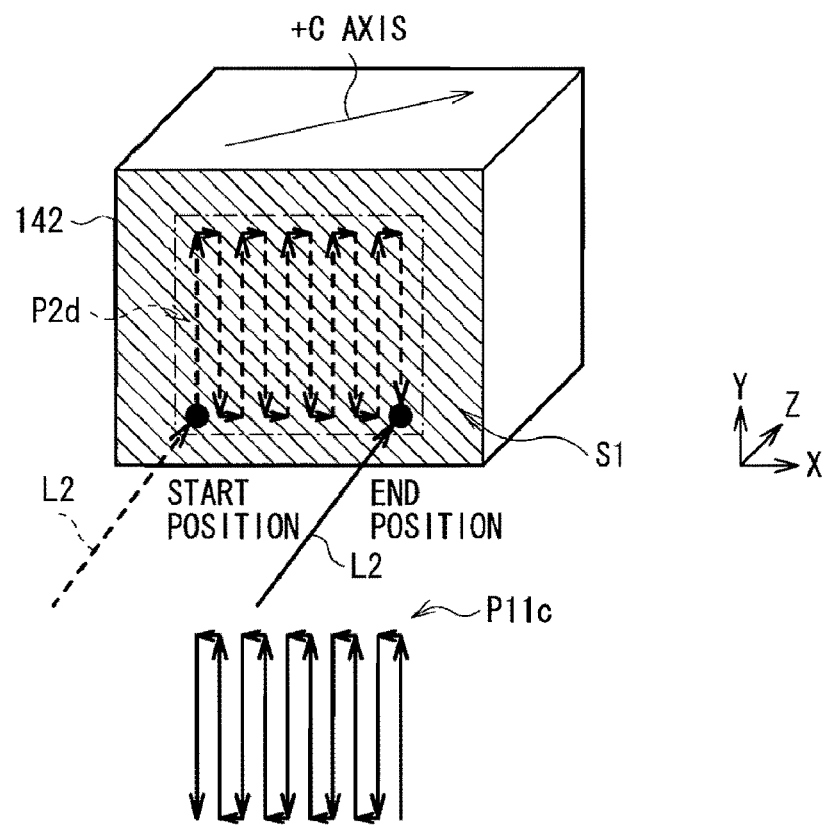

In addition, for example, in the case where the movement mechanism of the BBO crystal 142 corresponds to one-dimensional movement, the incident position of the second harmonic wave L2 may be relatively displaced, for example, in crystal movement directions P11a and P 11B and movement directions P2a and P2b of the laser light incident position in FIGS. 7A and 7B. Moreover, in the case where the movement mechanism of the BBO crystal 142 corresponds to two-dimensional movement, the incident position of the second harmonic wave L2 may be relatively displaced, for example, in crystal movement directions P11c and P11d and movement directions P2c and P2d of the laser light incident position in FIGS. 8A and 8B.

As described above, in the embodiment, when the wavelength of the second harmonic wave L2 is converted in the fourth harmonic wave generating section 14, the incident position of the second harmonic wave L2 is relatively displaced in the incident plane S1 in a direction including the projection direction component C1 of the +C axis to the incident plane S1 in the BBO crystal 142 or a direction orthogonal to the projection direction component C1 (that is, a direction not including the projection direction component of the −C axis to the incident plane S1 in the BBO crystal), so in the case where the BBO crystal 142 is deteriorated, for example, due to absorption of the fourth harmonic wave L4 in the deep ultraviolet region, the wavelength conversion efficiency in the fourth harmonic wave generating section 14 is efficiently recovered. Therefore, the wavelength conversion efficiency is allowed to be kept high for a longer time than ever before.

More specifically, the BBO crystal 142 is displaced in a direction not including the projection direction component C1 of the +C axis to the incident plane S1, so the incident position of the second harmonic wave L2 is relatively displaced in the incident plane S1 in a direction including the projection direction component C1 of the +C axis to the incident plane S1 or a direction orthogonal to the projection direction component C1.

Moreover, in the case where the incident position of the second harmonic wave L2 is relatively displaced continuously along a time axis, compared to the case where the incident position of the second harmonic wave L2 is relatively displaced at predetermined time intervals, the wavelength conversion efficiency in the fourth harmonic wave generating section 14 is recovered more efficiently.

Although the present invention is described referring to the embodiment, the invention is not limited thereto, and may be variously modified.

For example, unlike the above-described embodiment, the incident position of the second harmonic wave L2 may be relatively displaced according to the light amount of the fourth harmonic wave L4 detected by the light amount monitor section 16. More specifically, as the light amount of the fourth harmonic wave L4 declines, the relative displacement amount of the incident position of the second harmonic wave L2 or the relative displacement speed of the incident position of the second harmonic wave L2 may be increased, or the time intervals when relatively displacing the incident position of the second harmonic wave L2 may be reduced.

Moreover, in the above-described embodiment, the incident position of the second harmonic wave L2 as the incident laser light is relatively displaced when wavelength conversion from the second harmonic wave L2 to the fourth harmonic wave L4 is performed is described. However, for example, in the case where wavelength conversion of the fundamental wave L1 is performed, the incident position of the fundamental wave L1 as the incident laser light may be relatively displaced. Further, the invention is applicable to a wavelength conversion apparatus generating a deep ultraviolet beam by performing wavelength conversion of laser light in a region ranging from a near ultraviolet region to a visible light region obtained from a semiconductor laser (for example, a GaN-, GaInN-, AlN- or ZnSe-based semiconductor laser) capable of outputting the wavelength of the second harmonic wave L2 as a fundamental wave.

In the above-described embodiment, the case where the light amount monitor section 16 is arranged to displace the relative position of incident laser light is described. However, the light amount monitor section 16 may not be necessarily arranged.

In the above-described embodiment, the BBO crystal is described as an example of the nonlinear optical crystal to be displaced. However, for example, the present invention may be applied to any other nonlinear optical crystal such as CLBO.

In the above-described embodiment, the case where the BBO crystal 142 is displaced in a direction not including the projection direction component C1 of the +C axis to the incident plane S1 to relatively displace the incident position of the second harmonic wave L2 in a direction including the projection direction component C1 of the +C axis to the incident plane S1 or a direction orthogonal to the projection direction component C1 is described. However, the incident position of the second harmonic wave L2 may be directly displaced in these directions.

The processes described in the above-described embodiment or the like may be performed by hardware or software. In the case where the processes are performed by software, a program incorporating the software is installed in a generalpurpose computer or the like. Such a program may be recorded in a recording medium contained in a computer in advance.

The present application contains subject matter related to that disclosed in Japanese Priority Patent Application JP 2008-181049 filed in the Japanese Patent Office on Jul. 11, 2008, the entire content of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wavelength conversion apparatus comprising:
   a wavelength conversion section including a nonlinear optical crystal, and performing wavelength conversion of incident laser light by allowing the incident laser light to pass through the nonlinear optical crystal; and
   a relative position control section, when wavelength conversion is performed by the wavelength conversion section, relatively displacing the incident position of the incident laser light in an incident plane into which the incident laser light enters of the nonlinear optical crystal in a direction including a projection direction component of a +C axis to the incident plane in the nonlinear optical crystal or a direction orthogonal to the projection direction component.

2. The wavelength conversion apparatus according to claim 1 further comprising:
   a light amount detection section detecting the light amount of output laser light of which the wavelength is converted by the wavelength conversion section; and
   a light source control section controlling the output of a light source emitting, as a fundamental wave, the incident laser light or laser light which is a base of the incident laser light so that the light amount of the output laser light detected by the light amount detection section is kept constant,
   wherein the relative position control section relatively displaces the incident position of the incident laser light according to the output value of the light source controlled by the light source control section.

3. The wavelength conversion apparatus according to claim 2, wherein
   the relative position control section increases the relative displacement amount of the incident position according to an increase in the output value of the light source.

4. The wavelength conversion apparatus according to claim 2, wherein
   the relative position control section increases the relative displacement speed of the incident position according to an increase in the output value of the light source.

5. The wavelength conversion apparatus according to claim 2, wherein
   the relative position control section reduces a time interval when relatively displacing the incident position according to an increase in the output value of the light source.

6. The wavelength conversion apparatus according to claim 1, further comprising:
   a light amount detection section detecting the light amount of output laser light of which the wavelength is converted by the wavelength conversion section,
   wherein the relative position control section relatively displaces the incident position of the incident laser light according to the light amount of the output laser light detected by the light amount detection section.

7. The wavelength conversion apparatus according to claim 6, wherein
   the relative position control section increases the relative displacement amount of the incident position according to a decline in the light amount of the output laser light.

8. The wavelength conversion apparatus according to claim 6, wherein
   the relative position control section increases the relative displacement speed of the incident position according to a decline in the light amount of the output laser light.

9. The wavelength conversion apparatus according to claim 6, wherein
   the relative position control section reduces a time interval when relatively displacing the incident position according to a decline in the light amount of the output laser light.

10. The wavelength conversion apparatus according to claim 1, wherein
    the relative position control section relatively displaces the incident position of the incident laser light at predetermined time intervals.

11. The wavelength conversion apparatus according to claim 1, wherein
    the relative position control section relatively displaces the incident position of the incident laser light continuously along a time axis.

12. The wavelength conversion apparatus according to claim 1, wherein
    the nonlinear optical crystal is a BBO ($\beta$-BaB$_2$O$_4$) crystal.

13. The wavelength conversion apparatus according to claim 1, wherein
    the incident laser light is laser light in a green wavelength region, and
    output laser light of which the wavelength is converted by the wavelength conversion section is laser light in a deep ultraviolet region.

14. The wavelength conversion apparatus according to claim 1, wherein
    the relative position control section displaces the nonlinear optical crystal in a direction not including the projection direction component in the incident plane so as to relatively displace the incident position of the incident laser light in the incident plane in a direction including the projection direction component or a direction orthogonal to the projection direction component.

15. The wavelength conversion apparatus according to claim 14, wherein
    the relative position control section includes:
    a holding stage for holding the nonlinear optical crystal,
    a holding stage driving section displacing the holding stage, and
    a control section controlling displacement operation by the holding stage driving section so as to displace the nonlinear optical crystal in a direction not including the projection direction component in the incident plane.

16. A laser light generating apparatus comprising:
    a light source emitting laser light as a fundamental wave;
    a wavelength conversion section including a nonlinear optical crystal, and performing wavelength conversion of incident laser light by allowing the incident laser light to pass through the nonlinear optical crystal; and
    a relative position control section, when wavelength conversion is performed by the wavelength conversion section, relatively displacing the incident position of the incident laser light in an incident plane into which the incident laser light enters of the nonlinear optical crystal in a direction including a projection direction component of a +C axis to the incident plane in the nonlinear optical crystal or a direction orthogonal to the projection direction component.

17. A wavelength conversion method comprising the steps of:

performing wavelength conversion of incident laser light by allowing the incident laser light to pass through a nonlinear optical crystal; and when performing wavelength conversion, relatively displacing the incident position of the incident laser light in an incident plane into which the incident laser light enters of the nonlinear optical crystal in a direction including a projection direction component of a +C axis to the incident plane in the nonlinear optical crystal or a direction orthogonal to the projection direction component.

* * * * *

UNITED STATES PATENT AND TRADEMARK OFFICE
CERTIFICATE OF CORRECTION

| | | |
|---|---|---|
| PATENT NO. | : 7,920,607 B2 | |
| APPLICATION NO. | : 12/498480 | |
| DATED | : April 5, 2011 | |
| INVENTOR(S) | : Furutachi et al. | |

It is certified that error appears in the above-identified patent and that said Letters Patent is hereby corrected as shown below:

On the face page of the patent:

(75) "Hisashi Masuda, Chiba (JP)"

should be

(75) --Hisashi Masuda, Tokyo (JP)--

Signed and Sealed this
Sixteenth Day of August, 2011

David J. Kappos
*Director of the United States Patent and Trademark Office*